United States Patent [19]

Naumann et al.

[11] Patent Number: 5,555,632

[45] Date of Patent: Sep. 17, 1996

[54] APPARATUS FOR MEASURING THE CONTOURS OF A WHEEL

[75] Inventors: Hans J. Naumann, Albany, N.Y.; Reinhard Robotta, Erlau, Germany; Gunter Schröter; Rolf Oesterreich, both of Chemnitz, Germany

[73] Assignee: Niles-Simmons Industrieanlagen GmbH, Chemnitz, Germany

[21] Appl. No.: 385,034

[22] Filed: Feb. 7, 1995

[30] Foreign Application Priority Data

Feb. 8, 1994 [DE] Germany .................. P 44 03 951.4

[51] Int. Cl.⁶ .................................................. G01B 5/20
[52] U.S. Cl. .................................... 33/203; 73/105
[58] Field of Search .................. 33/1 M, 1 Q, 1 PT, 33/203, 203.15, 203.18, 287, 336, 338, 503, 523.1, 533, 546, 551, 556, 651, 772; 73/8, 104, 105, 146

[56] References Cited

U.S. PATENT DOCUMENTS

| | | | |
|---|---|---|---|
| 3,656,239 | 4/1972 | Hutchinson et al. ................ 33/722 |
| 4,402,218 | 9/1983 | Engel ................................ 73/104 |
| 4,545,128 | 10/1985 | Baker .......................... 33/203.18 |
| 4,896,964 | 1/1990 | Kitazume .......................... 73/146 |
| 5,351,411 | 10/1994 | Gronskov ......................... 33/1 Q |

FOREIGN PATENT DOCUMENTS 213493  9/1984  Germany ................... 33/203

*Primary Examiner*—William A. Cuchlinski, Jr.
*Assistant Examiner*—G. Bradley Bennett
*Attorney, Agent, or Firm*—Howard J. Greenwald

[57] ABSTRACT

An apparatus for measuring the contours of a railroad wheel which contains a tool slide, a measuring arm pivotally attached to the tool slide, a measuring wheel rotatably attached to the measuring arm, a device for moving the measuring arm horizontally, vertically, and pivotally, a marker, an optical sensor, and a device for sensing the movement of the measuring arm. The apparatus also contains a first encoder for determining the degree to which the measuring arm moves during any particular time during the rotation of the railroad wheel in any particular rotation cycle, and, additionally, a second encoder for determining at what point in said particular rotation cycle said measuring arm has moved.

6 Claims, 2 Drawing Sheets

APPARATUS FOR MEASURING THE CONTOURS OF A WHEEL

CROSS-REFERENCE TO RELATED PATENT APPLICATION

This application claims priority based upon prior German patent P 4403951.4, entitled "Measuring technique and measuring device for wheelsets of rail vehicles," which was filed in the German Patent Office on Feb. 8, 1994.

1. Field of the Invention

An apparatus for measuring the contours and dimensions of a wheel or a wheelset.

2. Background of the Invention

During operation the wheels of railroad rolling stock (such as locomotives and railroad cars) become worn. This wear often increases the risk of train derailment and, additionally, may accelerate wheel wear or otherwise adversely affect the running characteristics of the wheels.

There is a need for an effective, accurate, economical means of evaluating the profiles of railroad train wheels to readily determine how and to what extent they are worn.

One prior art means of evaluating the cross-sectional profiles of the wheels of railroad cars is disclosed in U.S. Pat. No. 3,656,239 of Desmond E. Hutchinson et al. The apparatus of this patent includes a wheel which is rotated by contact with a workpiece and drives a pulse generator. In the operation of this apparatus, the number of pulses generated during each revolution is counted and gives a direct indication of the workpiece diameter. The wheel is positioned by a unit which automatically sets the pressure of the wheel against the workpiece and retracts the wheel if any of a number of fault conditions occur (such as the feeding of the wheel against the side of a shoulder on the workpiece).

International Publication WO 92/14120, of Leif Gronskov et al., discloses an apparatus for the scanning of the profile of a train wheel. It contains a stationary part which supports a first arm and a second arm; the ends of these arms are coupled together by means of an angle-encoding joint. One of the arms comprises a free arm with a measuring wheel which is arranged to be moved in contact with the profile to be scanned. Both of the joints are electronic angle encoders which are coupled to a portable computer by an interface circuit.

In German patent DE-AS 18 15 689, a device is disclosed comprised of mechanical sensor devices (such as measuring wheels or probes) which are adapted to determine the profile wear, the distance of wheels between each other, and the wheel periphery. In German patent DE-AS 23 58 383 C2, a device is disclosed utilizing a pair of friction-wheel measuring instruments with separately swiveling receptors.

The primary problem with the prior art measuring devices is that a complex set of apparatuses is required to fully evaluate the characteristics of the wheel or the wheelset, and such apparatuses are often large and bulky.

It is an object of this invention to provide a relatively compact apparatus adapted to determine all of the parameters required for the profiling and reprofiling of a wheel, to evaluate such parameters for subsequent profiling or reprofiling on truing machinery, and to check to quality of machining operations after the truing process has been completed.

SUMMARY OF THE INVENTION

In accordance with this invention, there is provided an apparatus for measuring the contours of a railroad wheel which contains a tool slide, a measuring arm pivotally attached to the tool slide, a measuring wheel rotatably attached to the measuring arm, means for moving the measuring arm horizontally, means for moving the measuring arm vertically, means for pivoting the measuring arm, means for marking the railroad wheel, optical means for sensing the rotation of the railroad wheel, and means for sensing the movement of the measuring arm. The apparatus also contains a first encoder for determining the degree to which the measuring arm moves during any particular time during the rotation of the railroad wheel in any particular rotation cycle, and, additionally, a second encoder for determining at what point in said particular rotation cycle said measuring arm has moved.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

The present invention provides an efficient process, and apparatus, for use in measuring wheels and/or wheelsets of rail vehicles. The term wheelset, as used herein, refers to any kind of wheelset such as, e.g., a single-wheel suspension in a truck. Thus, e.g., the measuring device of this invention may be used with the wheelsets disclosed in U.S. Pat. Nos. 5,349,862 (railway wheelset), 5,335,602 (two wheelset units containing a drive unit and a brake unit), 5,282,425 (a steerable truck with a pair of wheelsets supporting a pair of laterally spaced side frames), 5,263,420 (three driven wheelsets elastically supported in a frame), 5,044,458 (selectively engageable wheelset), 4,895,408 (truck wheelset), 4,802,418 (wheelset steering apparatus), 4,674, 370, 4,445,439 (railroad vehicle truck with single wheelset), 4,445,439, 4,444,121, 4,424,750, 4,230,043, and the like. The disclosure of each of these United States patents is hereby incorporated by reference into this specification.

In general, the apparatus of this invention may be used with the wheels or wheelsets of any railroad rolling stock. Thus, e.g., it may be used with one or more of the wheels of locomotives which are described in U.S. Pat. Nos. 3,902,577 (locomotive four wheel truck), 3,982,164, 3,997,822, 4,065, 975, 4,276,793 (apparatus for truing the metal wheel of a railroad locomotive), 4,896,090, 4,924,395, 4,950,964, and the like. The disclosure of each of these United States patent applications is hereby incorporated by reference into this specification.

Figure 1:
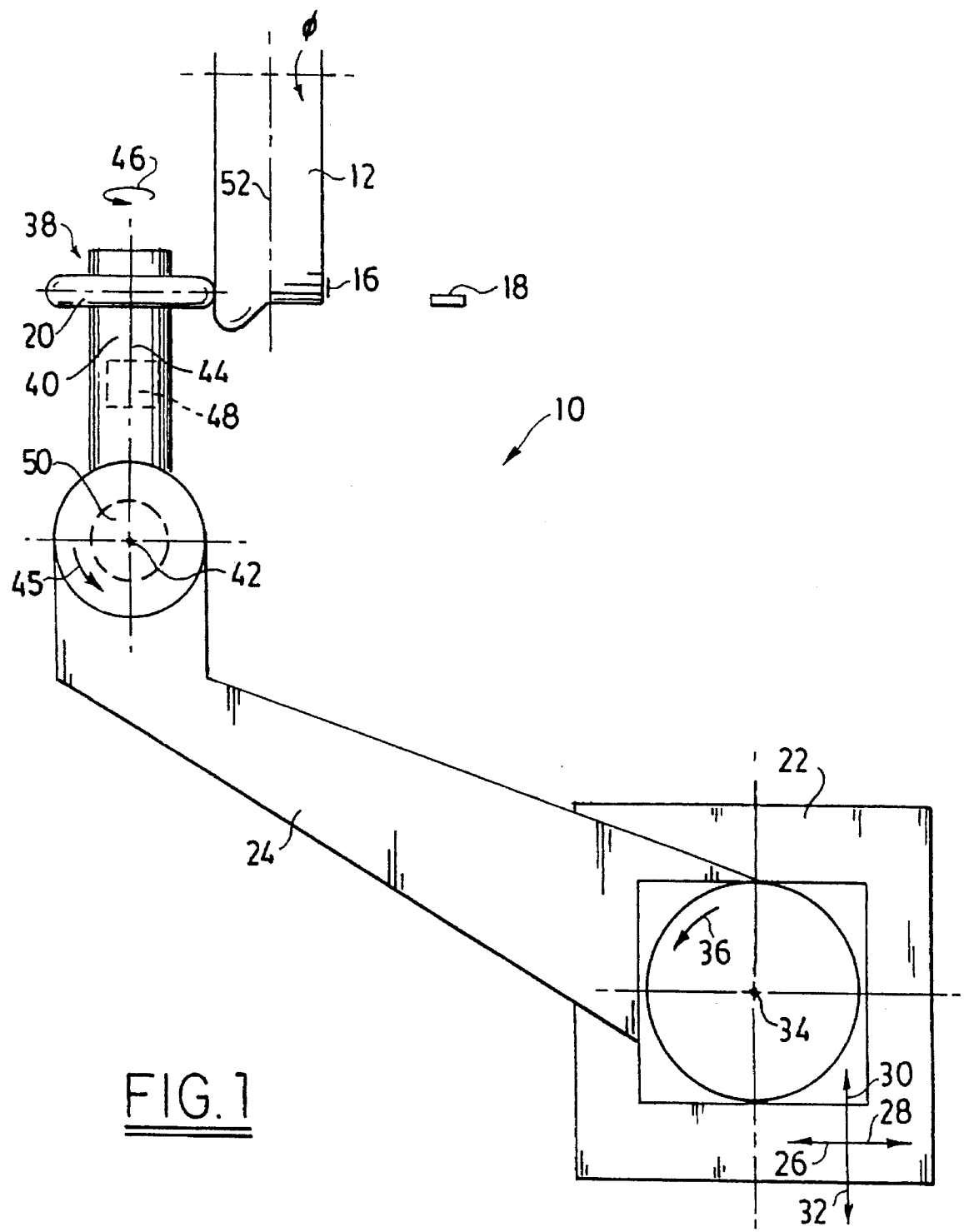
FIG. 1 is a sectional view of one preferred embodiment of the apparatus of this invention at a first stage of the measurement process.

FIG. 1 illustrates one preferred embodiment of the instant invention. Referring to FIG. 1, it will be seen that measuring apparatus 10 is adapted to measure the profile of a wheel 12 with a radius 14 (see FIG. 2).

The apparatus 10 is preferably comprised of means for marking wheel 12 such as, e.g., mark 16.

Conventional means for marking a wheel so that, during rotation of such wheel, the mark will be sensed by a sensor, may be used in the claimed apparatus. Thus, by way of illustration, one may use the means described in U.S. Pat. No. 5,130,641 (the entire disclosure of which is hereby incorporated by reference into this specification) which includes a sensor for detecting the rotation of an eddy wheel in an electric power meter. In the device of this patent, a mark on the edge of the eddy wheel interrupts the output of light detectors arranged to sense reflections from a light source aimed at the eddy wheel.

Referring again to FIGS. 1 and 2, it is preferred that mark 16 be removably attached to wheel 12 and that it be adapted to activate sensor 18 every time wheel 12 makes one revolution.

It is preferred that sensor 18 be an optical sensor which is adapted to sense the revolutions of wheel 12. Thus, by way of illustration and not limitation, one may use the optical sensors described in U.S. Pat. Nos. 5,334,249 (which describes a device containing markers rotated by a timing wheel and an optical sensor coupled to a position adjacent the moving markers), 5,267,654, 5,199,176, 5,129,606 (railway wheel sensors), and the like; the entire disclosure of each of these United States patents is hereby incorporated by reference into this specification.

Referring again to FIG. 1, and in one preferred process, the wheel 12 is preferably located firmly in a measuring or truing machine (not shown). Such machines, although not part of the invention, are well known. Reference may be had to U.S. Pat. Nos. 4,276,793 (which discloses an apparatus for truing a metal wheel of a railroad locomotive), 4,585,046, 4,825,737, 5,243,765, 4,045,852, 4,014,139, 3,789,475, 3,598,017, and the like. The disclosure of each of these United States patents is hereby incorporated by reference into this specification.

Referring again to FIG. 1, measuring wheel 20, which is contiguous with wheel 12, and is disposed so that it is approximately perpendicular to the face of the wheel 12 to be measured.

Tool slide 22 is adapted to move measuring arm 24 horizontally, in the directions of arrow 26 and/or 28. Tool slide 22 is also adapted to move measuring arm 24 vertically, in the directions of arrows 30 and/or 32. In one embodiment, in addition to containing means for moving measuring arm 24 in the x and y axes, the device 10 may also contains means for moving measuring arm 24 in the z axis.

Figure 2:
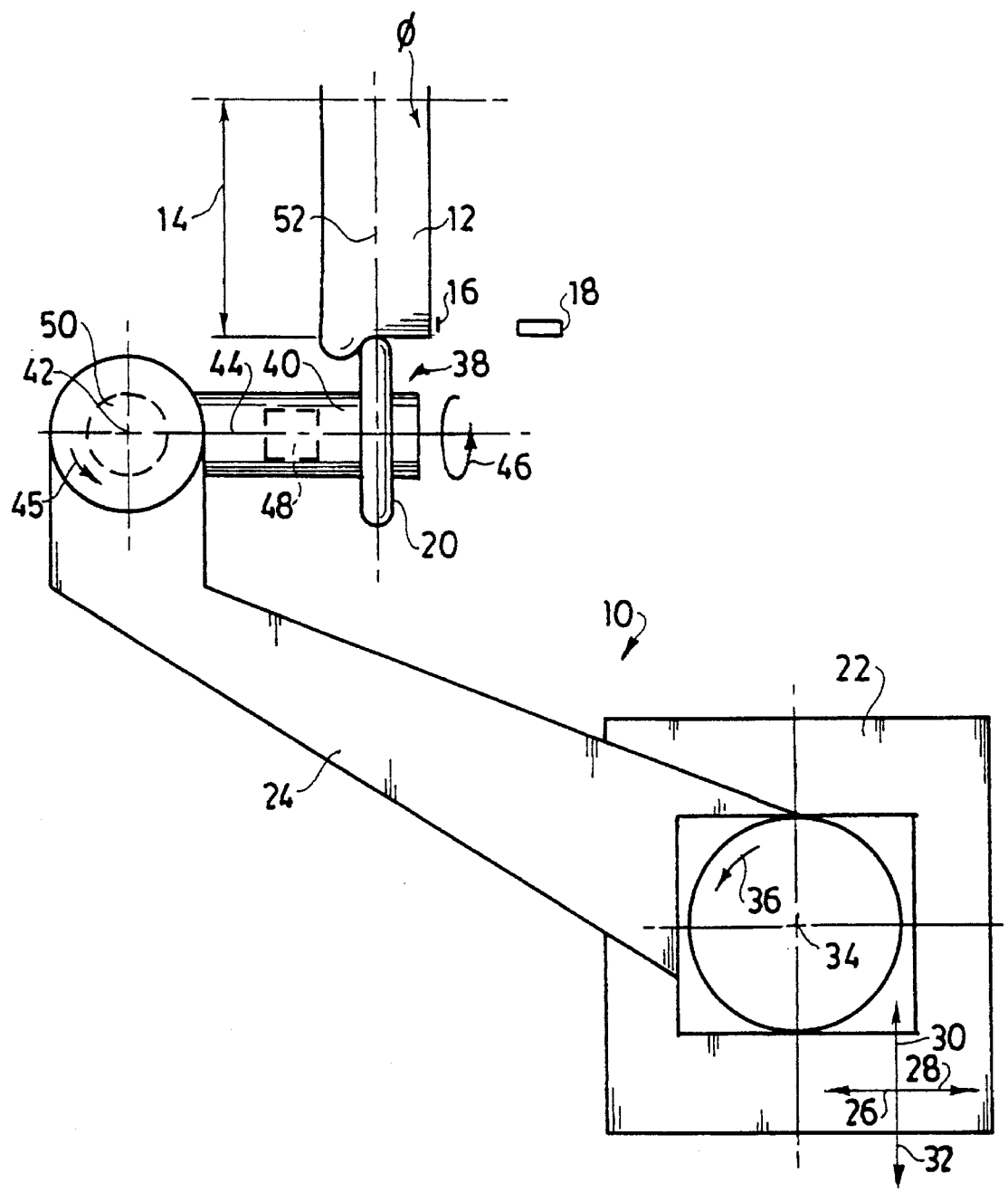
FIG. 2 is a sectional view of the apparatus of FIG. 1 at a second stage of the measurement process.

Furthermore, measuring arm 24 can be swiveled through swivel axis 34 through swivel angle 36; in one embodiment, measuring arm 24 is pivotally attached to tool slide 22. Thus, as will be apparent to those skilled in the art, substantially any measuring position can be assumed for wheel 20, and for any such position to be measured on wheel 12, wheel 20 may be positioned so that it substantially at a 90 degree angle to wheel 12. One of these positions is illustrated in FIG. 1; another of these positions is illustrated in FIG. 2; other positions which are possible will be apparent to those skilled in the art.

Although one means of positioning measuring wheel 20 in a multiplicity of positions vis-a-vis wheel 12 has been illustrated in FIG. 1, it will be apparent to those skilled in the art that other such means also could be utilized in the apparatus of this invention.

Referring again to FIG. 1, and in the preferred embodiment illustrated therein, it will be seen that the end 38 of measuring arm 24 contains a measuring wheel receptor 40 adapted to be swiveled through a second swivel axis 42 by a variable swivel angle 45 to be metrologically tracked.

As will be apparent to those skilled in the art, data produced from the rotation of measuring wheel 20 will be received by measuring wheel receptor 40, which is operatively connected to encoder 48, which is then able to determine at what point in any particular cycle the measuring wheel 20 is at (e.g., at the marker 16, 90 degrees from marker 16, etc.). Data from wheel receptor 40 which relates to the extent to which, if any, measuring wheel 20 is displaced by irregularities on the surface of wheel 12 is furnished to encoder 50, which is then able to determine, at any point in any particular cycle of rotation, to what extent, if any, measuring wheel 20 is displaced from its normal position.

One may use the conventional encoders known to those skilled in the art in the apparatus of this invention. By way of illustration and not limitation, one may use one or more of the encoders disclosed in U.S. Pat. Nos. 5,317,812 (measuring wheel operatively connected to an encoder), 5,317,149 (optical encoder), 5,301,427 (encoder wheel), 5,219,660 (rotary encoder), 5,282,382 (encoder wheel), 5,274,229 (absolute position encoder), 5,259,562 (wheel shaft encoder), 5,257,458 (rotary encoder), 5,252,967 (wheel position encoder), 5,248,939 (encoder mounted on a wheel), 5,243,338 (wheel position encoder), 5,241,172 (optical encoder), 5,231,391 (rotating encoder element), 5,223,706, 5,201,224, 5,175,498 (digital rotary shaft encoder), 5,175,415 (encoder wheel), 5,123,496 (absolute value rotary encoder), 5,013,910 (shaft angle encoder), 4,643,425 (optical encoder for sensing the position of a marker on a wheel), and the like. The entire disclosure of each of these United States patents is hereby incorporated by reference into this specification.

Referring again to FIGS. 1 and 2, and in the preferred embodiment illustrated therein, the measuring wheel receptor 40 supports measuring wheel 20 which pivots through pivot axis 44 by the measurable pivot angle 46.

FIGS. 1 and 2 illustrate two different measuring positions which may be, but need not be, in perpendicular arrangement to each other. However, by moving the measuring device 10 in the directions of arrows 26 and/or 28, and/or of arrows 30 and/or 32, and/or by swiveling arm 24 around pivot point 34, the measuring device 10 is preferably positioned so that wheel 20 is positioned to the profile contour of wheel 12, or to the inner wheel tire face of wheel 12, at an angle of about ninety degrees.

Referring again to FIGS. 1 and 2, and in the preferred embodiment illustrated therein, measuring device 10 is also comprised of an additional rotary encoder 48 for pivot angle 46 for angular allocation of wheel 20. Furthermore, measuring device 20 also is preferably comprised of rotary encoder 50 for swivel angle 45. As will be apparent to those skilled in the art, this arrangement allows the measurement of the real radius, the concentricity, and the face runout of wheel 12 in interaction with a machine control system. It is preferred that low-friction machine elements be used here in order to insure exact transmission of measurement results.

Referring again to FIG. 1, it will be seen that, by swiveling the measuring wheel 20 through the swivel axis 42 (so that, e.g., angle 45 is ninety degrees), measuring device 10 permits the measurement of face runout even in dependence of the pivot angle of wheel phi whose evaluation is used for determining the axial position of the measuring circle of wheel profile 52 of wheel 12, as well as for tool positioning. By traversing the measuring device 10 along an equidistant to the profile contour the x and y axis of tool slide 22 (see FIG. 2), utilizing the swivel angle 45, the offset from a setpoint profile can be determined.

Furthermore, by subsequently turning the wheel 12 and repeating these operations, an envelope curve of the profile of wheel 12 may be generated. Thus, measuring device 10 is capable of determining the real radius of wheel 12 simultaneously for each pivot angle phi of wheel 12 of a wheel. This is especially advantageous for use for devices with non-accessible pivot centers (e.g., closed bearing housings).

Referring again to FIG. 2, the measuring wheel 20 is contiguous with the circumference of wheel 12 and is aligned with the axis of rotation 52 at the point at which a measurement of wheel is to be taken. For each swivel angle 45 measured by device 10, a corresponding pivot angle 46 is measured and recorded. The reference point is the signal generated by sensor 18 at mark 16. Thus, it is possible to derive a relationship between pivot angle phi of wheel 12 and an unknown, measurable average radius 14 from the peripheral measurement by evaluating these measured values. The real radii of wheel 12 are then taken into consideration during the machining of the wheel by matching the machining parameters. By way of illustration, wheel flats and warps can be determined and/or economical machining as well as radius relationship of at least two wheels, one to another, can be ensured. The radial and axial runout as measured via deflection of measuring arm 24 through a pivot center (preferably in the rotary mode).

By mounting the measuring wheel 20 in its measuring plane, the periphery of wheel 12 can be measured by measuring the pivot angle 46 with the use of additional rotary encoder 48, and the offset from the average radius 14 can be measured via swivel angle 45 by means of rotary encoder 50. The starting point of the measuring operation is defined by sensor 18, when it interacts with mark 16.

It will be appreciated that more than one mark 16 may be used, and measurements can be accomplished respectively in the sections of one revolution of wheel 12 defined by such marks. Alternatively, or additionally, one may use a measuring system for detecting mark 16 other than optical sensor 18.

Calculation of the real radii allocated to each pivot angle phi of wheel 12 is effected through the angular increments of pivot angle 46. Applying the device 10, preliminary as well as subsequent measurements can be taken on the wheel 12 or the wheelset.

The preferred process of this invention

In one preferred process of this invention, the measuring device 10 may be moved from a parking position to a first measuring position (see FIG. 1) in which the measuring wheel 20 is contiguous with the face of the railroad wheel 12. Thereafter, the measuring wheel 20 may be caused to rotate by rotating railroad wheel 12 while the extent to which the measuring arm 24 is displaced during the rotation of railroad wheel 12 is measured and recorded for each and every point during the rotation cycle. The face runout of railroad wheel 12 may thus be determined.

Thereafter, the measuring device 10 may be moved to a second measuring position (see FIG. 2) in which the measuring wheel 20 is contiguous with a portion of the wheel profile of wheel 12, and the process may then be repeated.

Thereafter, the measuring device 10 may be returned to its parking position.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. An apparatus for measuring the contours of a railroad wheel comprising a tool slide, a measuring arm pivotally attached to said tool slide, a measuring wheel rotatably attached to said measuring arm, means for moving said measuring arm horizontally, means for moving said measuring arm vertically, means for pivoting said measuring arm, a mark, optical means for sensing the rotation of said railroad wheel, and means for sensing the movement of said measuring arm, wherein:
    (a) said apparatus is comprised of a first encoder for determining the degree to which said measuring arm moves during any particular time during the rotation of said railroad wheel in any particular rotation cycle, and
    (b) said apparatus is comprised of a second encoder for determining at what point in said particular rotation cycle said measuring arm has moved.

2. The apparatus as recited in claim 1, wherein said measuring arm is connected to a measuring wheel receptor.

3. The apparatus as recited in claim 2, wherein said measuring wheel receptor is pivotally connected to said measuring arm.

4. The apparatus as recited in claim 3, wherein said measuring wheel receptor is connected to said measuring arm at a first end of said measuring arm.

5. The apparatus as recited in claim 1, wherein said measuring wheel is comprised of a thin disk.

6. A process for measuring a railway wheel, comprising the steps of:
    (a) providing an apparatus for measuring the contours of a railroad wheel comprising a tool slide, a measuring arm pivotally attached to said tool slide, a measuring wheel rotatably attached to said measuring arm, means for moving said measuring arm horizontally, means for moving said measuring arm vertically, means for pivoting said measuring arm, means for marking said railroad wheel, optical means for sensing the rotation of said railroad wheel, and means for sensing the movement of said measuring arm, wherein:
        1. said apparatus is comprised of a first encoder for determining the degree to which said measuring arm moves during any particular time during the rotation of said railroad wheel in any particular rotation cycle, and
        2. said apparatus is comprised of a second encoder for determining at what point in said particular rotation cycle said measuring arm has moved;
    (b) moving said apparatus from a parking position to a first measuring position in which said measuring wheel is contiguous with the face of said railroad wheel;
    (c) thereafter rotating said railroad wheel and said measuring wheel while determining both the degree to which said measuring arm moves during any particular time during the rotation of said railroad wheel in any particular rotation cycle and at what points in said particular rotation cycle said measuring arm has moved;
    (d) thereafter moving said apparatus to a second measuring position in which said measuring wheel is contiguous with the profile of said railroad wheel;
    (e) thereafter rotating said railroad wheel and said measuring wheel while determining both the degree to which said measuring arm moves during any particular time during the rotation of said railroad wheel in any particular rotation cycle and at what points in said particular rotation cycle said measuring arm has moved; and
    (f) thereafter moving said apparatus to said parking position.

* * * * *